Figure 1:
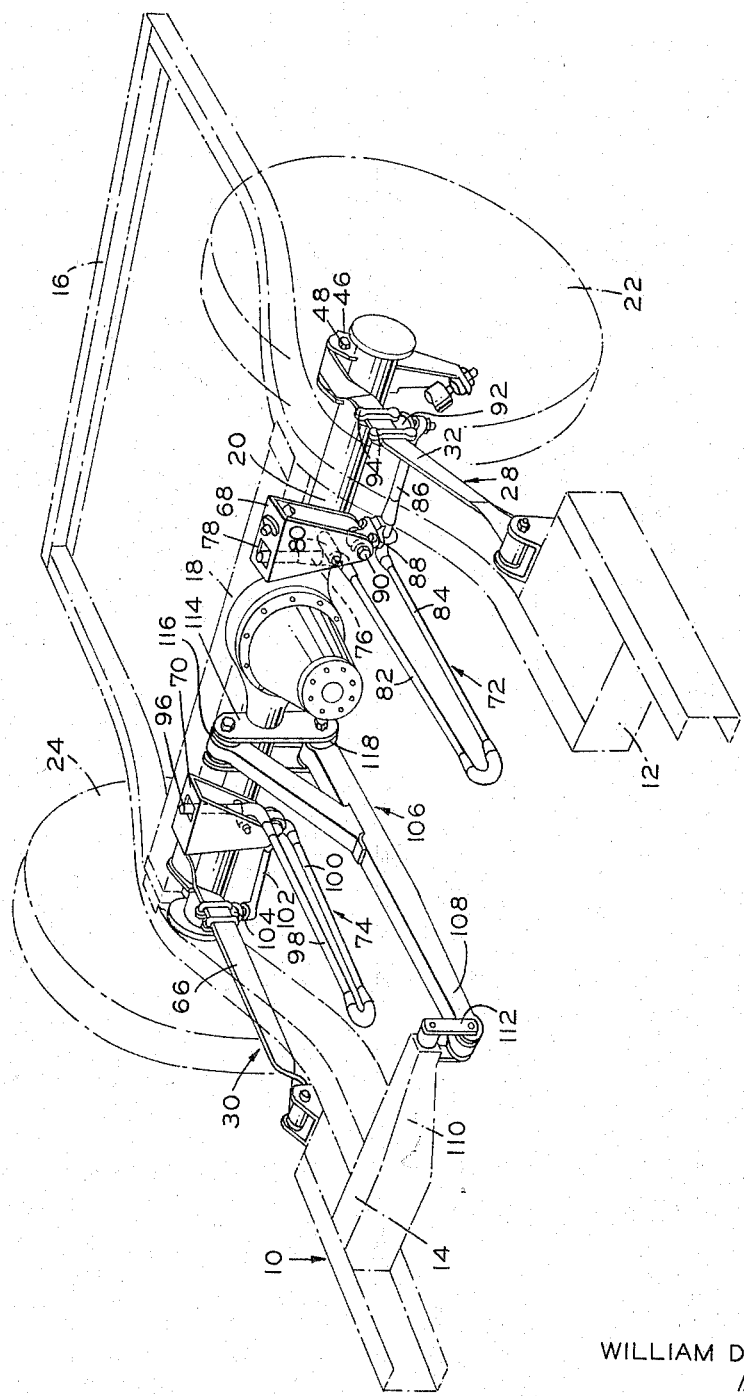

WILLIAM D. ALLISON
INVENTOR

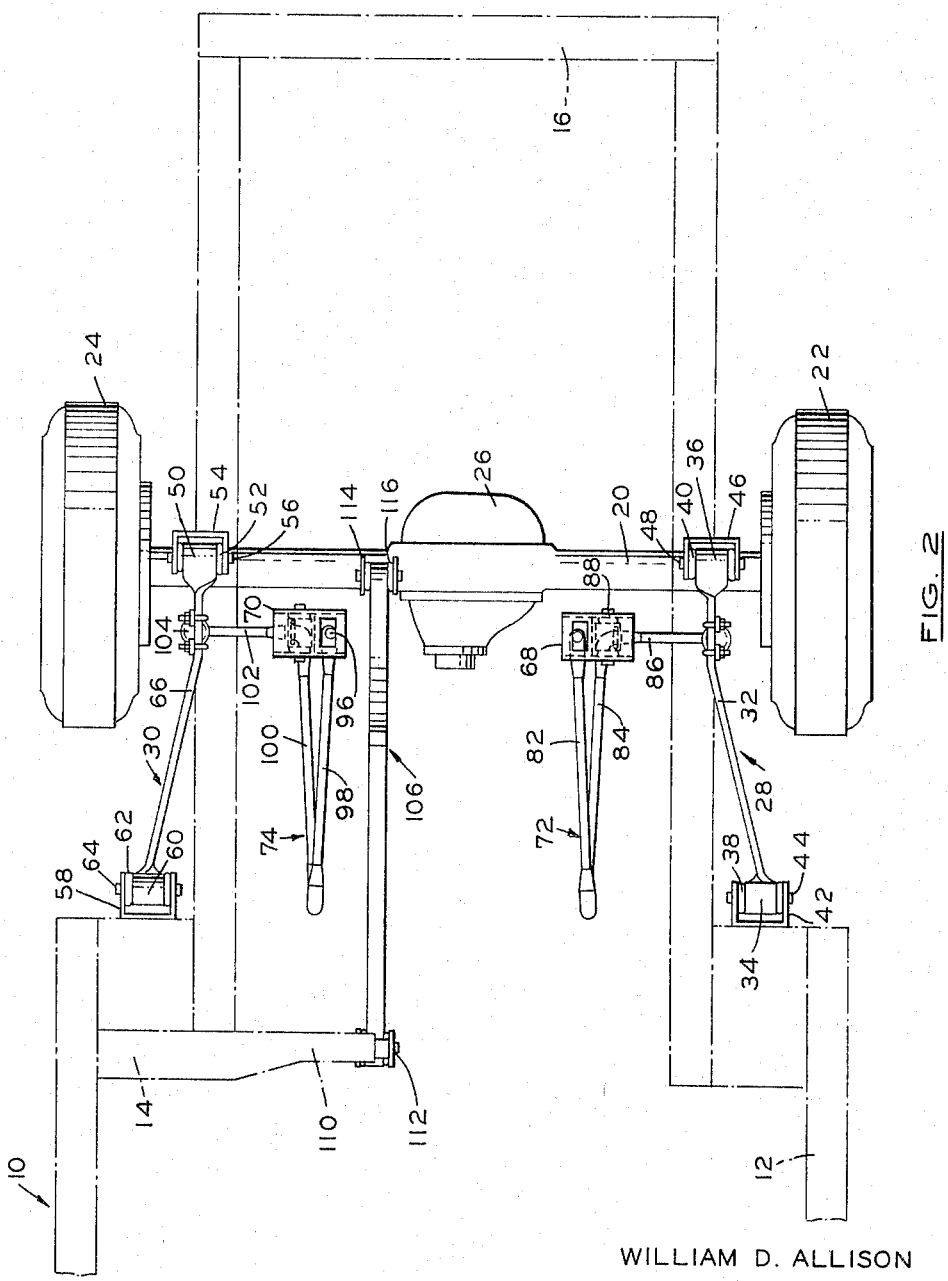

United States Patent Office 3,284,095
Patented Nov. 8, 1966

3,284,095
LINKAGE TYPE REAR SUSPENSION SYSTEM FOR A MOTOR VEHICLE
William D. Allison, Grosse Pointe Farms, Mich., assignor to Ford Motor Company, Dearborn, Mich., a corporation of Delaware
Continuation of application Ser. No. 419,483, Dec. 18, 1964. This application Apr. 1, 1966, Ser. No. 544,654
17 Claims. (Cl. 280—124)

This application is a continuation of my copending application Serial Number 419,483, filed December 18, 1964 and entitled "Linkage Type Rear Suspension System for a Motor Vehicle."

The present invention is generally related to rear suspension systems for motor vehicles, and more particularly to a rear suspension system of the linkage type.

It is the basic object of any motor vehicle suspension system to resiliently support the vehicle body upon the wheels and to isolate road irregularities from the passenger compartment. In addition, a superior vehicle suspension system should provide a soft boulevard ride, have good road holding qualities while cornering, and isolate noise and vibration from the vehicle body.

These features are not always compatible. In a conventional suspension structure, a soft ride usually leads to instability at high vehicle speeds or loss of precise cornering control. Similarly, a suspension system having exceptional vehicle control characteristics is usually accompanied by a harsh ride.

Therefore, it is the principal object of the present invention to provide a superior vehicle suspension system of the linkage type which combines these desirable operating characteristics.

It is a further object of the present invention to provide a rear suspension system that is so arranged that when a side force is applied to the sprung mass, the rear of the vehicle is displaced sideways relative to the rear axle. This lateral displacement is known in the art as lateral compliance. Lateral compliance is desirable because it reduces ride harshness and side shake.

It is another object of the present invention to provide a pair of suspension arms or links that extend forwardly and outwardly in a diverging relationship from the axle housing to their attachments with the body so that lateral displacement of the body is accompanied by a canting of the axle in the direction of understeer.

It is still another object of the invention to provide a torque arm which interconnects the axle housing and the vehicle body. In accordance with the preferred embodiment of the present invention, the torque arm is connected to the axle housing by a resilient means which permits lateral displacement of the body relative to the axle. The torque arm prevents rotation of the axle during acceleration and braking. In a suspension of the present invention, the torque reaction is handled solely by the torque arm and is isolated from the other suspension arms and links.

Another object of the present invention is to connect the forward end of the torque arm to the vehicle body by a shackle device so that the torque arm cannot be loaded in either compression or tension during acceleration and braking. The diverging suspension arms carry all of the braking and accelerating forces while the torque arm acts as the sole torque reaction member to prevent rotation of the axle housing.

The many objects and advantages of the present invention will become amply apparent upon consideraton of the following discussion and the accompanying drawings in which:

FIGURE 1 is a perspective view of a vehicle rear suspension system of the linkage type constructed in accordance with the present invention, and FIGURE 2 is a top plan view of the suspension of FIGURE 1.

Referring now to the drawings wherein the presently preferred embodiment is illustrated, FIGURE 1 discloses a vehicle frame 10 which is comprised of left and right side rails 12 and 14. The side rails 12, 14 are interconnected at their rear ends by a cross frame member 16 and at a point forwardly of member 16 by a second cross frame member 18.

An axle housing 20 rotatably supports a left and a right road wheel 22 and 24 at its outer ends. The axle housing 20 has a differential housing 26 that is centrally located. Housing 26 contains gearing for distributing torque through axle shafts contained within the axle housing 20. The axle shafts drive the road wheels 22 and 24.

Suspension means are provided to interconnect the axle housing 20 and the frame 10. In accordance with the present invention, the suspension means comprise left and right suspension links 28 and 30. The suspension links are arranged in a generally forwardly and outwardly diverging relationship. The left link 28 is formed of leaf spring steel and has a central portion 32 that is arranged in a vertical plane. At the ends of the left link 28, leaf spring eyes 34 and 36 are formed. The eyes 34 and 36 have generally transverse pivot axes. Rubber bushings are positioned within the eyes 34 and 36 and are indicated by the reference numerals 38 and 40. A bracket 42 is connected to the left frame rail 12 and is used to pivotally support, by the means of a pivot bolt 44, the eye 34 and the forward end of the left link 28. A bracket 46 is welded to the outer left-hand end of the axle housing 20 which pivotally supports the bushing 40 within the eye 36 by means of a pivot bolt 48.

The construction and connection of the right-hand suspension link 30 is generally similar. The rear end of the link 30 is formed into an eye 50 which contains a bushing 52 and is pivotally connected to an axle housing bracket 54 by means of a pivot bolt 56. A forward bracket 58 is secured to the frame side rail 14 and is connected to an eye 60 formed at the forward end of the link 30. A bushing 62 is disposed within the eye 60 and is pivotally connected to a pivot bolt 64. The leaf spring link 30 also has a vertically arranged centrally situated section between the eyes 50 and 60. This section is indicated by the reference numeral 66.

A pair of brackets 68 and 70 are welded or otherwise secured to the frame cross member 18. These brackets have depending portions that are adapted to engage hairpin-shaped torsion bars 72 and 74. Left bar 72 is provided with an upstanding right angle end portion 76 which has its upper end extending through an opening 78 in the bracket 68. Near the bend of the angled end portion 76, a reaction member 80 is secured to the bracket 68. The bar has a torsional portion 82 which extends forwardly from the angled end 76. The bar 72 then doubles back to form a second torsional portion 84. The end of the torsional portion 84 is outwardly formed into an angled load lever arm 86.

A fitting 88 is secured to the angled end 86 of the bar 72 near its connection with the torsional portion 84. The fitting 88 is pivotally connected to a bolt 90 that is secured to the lower end of the bracket 68. The laterally outer end of the angled arm 86 is connected to the stud portion of a ball and socket joint 92. The socket portion of that joint is secured to the portion 32 of left spring suspension link 28 by a pair of special bolts 94.

The angled ends 76 and 86 of the torsion bar 72 constitute load lever arms for transferring spring load from the chassis bracket 68 to the suspension arm 28.

Right torsion bar 74 is similarly arranged and connected. Bar 74 has an angled end portion 96 that is secured within the bracket 70 and is integrally connected to a torsional segment 98. The bar 74 doubles back on the torsional segment 98 to form a second torsional segment 100. A laterally extending load lever arm 102 is integrally connected to the end of the torsional segment 100. The outer end of the lever arm 102 is connected to the vertically arranged portion 66 of the spring suspension link 30 by the means of a ball joint 104. The inner end of the lever arm portion 102 is pivotally connected to the bracket 70 by means of a special fitting similar in construction to left-hand fitting 88 that is pivotally connected to the bracket 68.

A torque arm 106 is provided to prevent rotation of the axle housing 20. The torque arm 106 has a forward end 108 that is connected to an extension 110 from the side rail 14 by means of a shackle 112. A bracket 114 is welded to the axle housing 20 and supports vertically spaced apart resilient bushings 116 and 118. These bushings are connected, in turn, to the rear end of the torque arm 106. It is noted that the torque arm 106 has a bifurcated end construction for attachments to the bushings 116 and 118.

The rear suspension is arranged so that when a side force is applied to the sprung mass, the rear of the vehicle body is displaced sideways relative to the rear axle 20. This lateral displacement is permitted by the resilient flexibility of the spring metal links 28 and 30 which interconnect the axle housing and the frame. Since the front of the body does not move laterally, the body undergoes angular rotation about a vertical axis through the center of the front tread. Each point on the sprung mass rotates about this axis in proportion to its distance from the axis and the amount of lateral displacement or compliance at the rear suspension.

This lateral displacement of the sprung mass at the rear axle is utilized to effect a steering movement of the rear axle 20 in a direction to oppose the side force. The steering of the rear axle 20 is accomplished by the angular placement of the two spaced spring metal suspension links 20, 30 connecting the axle 20 to the frame 10. As the frame pivots 44, 64 of the suspension links 28, 30 rotate around the vertical front axis, the pivot on one side of the car goes forward and out, and the opposite pivot moves in and rearwardly relative to the center of the rear axle 20. The fixed length of each suspension link 28 and 30 imparts a steering movement to the rear axle 20 according to the spacing and angular positions of the links 28 and 30.

Inasmuch as the steering movement applied to the rear axle 20 is in a direction to oppose the side force, it is considered to be in the direction of understeer. The understeering produced by lateral compliance is proportional to the lateral force and is not appreciably effective by vehicle ride height in contrast to the pronounced effect of ride height on the rear axle steer produced by body roll.

In addition to providing a means of obtaining rear suspension understeering that is insensitive to ride height, lateral compliance provides other benefits in the forms of increased road holding on corners and a reduction in side shake. In a solid axle rear suspension system, individual vertical movement of either rear wheel imparts a sideways push to the sprung mass at the roll center. The application of lateral forces to the body produces noise, vibration and side shake. Lateral compliance or flexibility between the sprung mass and the rear axle permits the axle to follow road irregularities with a substantial reduction in the magnitude lateral forces between the body and axle in comparison with the conventional rear suspension. The net effect on the body is a pronounced reduction in noise, vibration and harshness. The net effect on the axle is a greatly increased traction on corners due to the diminished peak side forces applied to the tires.

The foregoing description constitutes the presently preferred embodiment of this invention. Modifications and alterations may occur to those skilled in the art which will come within the scope and spirit of the following claims.

I claim.

1. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, said suspension links being formed of leaf spring material and having laterally resilient spring portions, a pair of left and right brackets secured to said frame adjacent to said links, a pair of left and right U-shaped torsion bars, each of said bars having one lever arm end secured to a bracket and another portion pivotally connected to the same bracket, said torsion bars each having a laterally extending lever arm portion connected to a suspension link, a ball and socket joint interconnecting the ends of said laterally extending lever arms and said suspension links, a torque arm interconnecting said axle and said frame, means connecting one end of said torque arm to said axle and constructed to permit lateral displacement of said axle relative to said frame while at the same time resisting rotation of said axle about its own axis, said means comprising a bracket secured to said axle and having vertically spaced apart resilient bushings, said one end of said torque arm being connected to said spaced apart bushings, means connecting the other end of said torque arm to said frame and constructed to permit said other end to be displaced longitudinally while resisting vertical displacement of said other end relative to said frame, said means comprising a shackle pivotally connected to said frame at one of its ends and pivotally connected to said torque arm at the other of its ends, said suspension means permitting said vehicle frame to move laterally with respect to said axle whereby one end of said axle is moved forwardly and the other end of said axle is moved rearwardly to provide an understeer effect.

2. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, a pair of left and right brackets secured to said frame adjacent to said links, a pair of left and right U-shaped torsion bars, each of said bars having one lever arm end secured to a bracket and another portion pivotally connected to the same bracket, said torsion bars each having a laterally extending lever arm portion connected to a suspension link, a torque arm interconecting said axle and said frame, means connecting one end of said torque arm to said axle and constructed to permit lateral displacement of said axle relative to said frame while at the same time resisting rotation of said axle about its own axis, said means comprising a bracket secured to said axle and having vertically spaced apart resilient bushings, said one end of said torque arm being connected to said spaced apart bushings, means connecting the other end of said torque arm to said frame and constructed to permit said other end to be displaced longitudinally while resisting vertical displacement of said other end relative to said frame, said means comprising a shackle pivotally connected to said frame at one of its ends and pivotally connected to said torque arm at the other of its ends, said suspension means permitting said vehicle frame to move laterally with respect to said axle whereby one end of said axle is moved forwardly and the other end of said axle is moved rearwardly to provide an understeer effect.

3. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, said suspension links being formed of leaf spring material and having laterally resilient spring portions, a pair of left and right brackets secured to said frame adjacent to said links, a pair of left and right U-shaped torsion bars, each of said bars having one lever arm end secured to a bracket and another portion pivotally connected to the same bracket, said torsion bars each having a laterally extending lever arm portion connected to a suspension link, a torque arm interconnecting said axle and said frame, means connecting one end of said torque arm to said axle and constructed to permit lateral displacement of said axle relative to said frame while at the same time resisting rotation of said axle about its own axis, means connecting the other end of said torque arm to said frame and constructed to permit said other end to be displaced longitudinally while resisting vertical displacement of said other end relative to said frame, said means comprising a shackle pivotally connected to said frame at one of its ends and pivotally connected to said torque arm at the other of its ends, said suspension means permitting said vehicle frame to move laterally with respect to said axle whereby one end of said axle is moved forwardly and the other end of said axle is moved rearwardly to provide an understeer effect.

4. A vehicle frame, a vehicle axle, suspension means interconecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, said suspension links being formed of leaf spring material and having laterally resilient spring portions, a pair of left and right brackets secured to said frame adjacent to said links, a pair of left and right U-shaped torsion bars, each of said bars having one lever arm end secured to a bracket and another portion pivotally connected to the same bracket, said torsion bars each having a laterally extending lever arm portion connected to a suspension link, a torque arm interconnecting said axle and said frame, means connecting one end of said torque arm to said axle and constructed to permit lateral displacement of said axle relative to said frame while at the same time resisting rotation of said axle about its own axis, means connecting the other end of said torque arm to said frame and constructed to permit said other end to be displaced longitudinally while resisting vertical displacement of said other end relative to said frame, said suspension means permitting said vehicle frame to move laterally with respect to said axle whereby one end of said axle is moved forwardly and the other end of said axle is moved rearwardly to provide an understeer effect.

5. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, said suspension links being formed of leaf spring material and having laterally resilient spring portions, a pair of left and right brackets secured to said frame adjacent to said links, a pair of left and right U-shaped torsion bars, each of said bars having one lever arm end secured to a bracket and another portion pivotally connected to the same bracket, said torsion bars each having a laterally extending lever arm portion connected to a suspension link, a torque arm interconnecting said axle and said frame, said suspension means permitting said vehicle frame to move laterally with respect to said axle housing whereby one end of said axle housing is moved forwardly and the other end of said axle housing is moved rearwardly to provide an understeer effect.

6. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, said suspension links having laterally resilient spring portions, a pair of left and right U-shaped torsion bars, each of said bars having one lever arm end secured to said frame and a laterally extending lever arm portion connected to a suspension link, a torque arm interconnecting said axle and said frame, means connecting one end of said torque arm to said axle and constructed to permit lateral displacement of said axle relative to said frame while at the same time resisting rotation of said axle about its own axis, means connecting the other end of said torque arm to said frame and constructed to permit said other end to be displaced longitudinally while resisting vertical displacement of said other end relative to said frame, said suspension means permitting said vehicle frame to move laterally with respect to said axle whereby one end of said axle is moved forwardly and the other end of said axle is moved rearwardly to provide an understeer effect.

7. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being formed of leaf spring material and having laterally resilient spring portions, a pair of U-shaped torsion bars each having one lever arm end secured to said frame and another lever arm end connected to a suspension link, a torque arm interconnecting said axle and said frame, means connecting one end of said torque arm to said axle constructed to permit lateral displacement of said axle relative to said frame while at the same time resisting rotation of said axle about its own axis, means connecting the other end of said torque arm to said frame constructed to permit said other end to be displaced longitudinally while resisting vertical displacement of said other end relative to said frame.

8. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being formed of leaf spring material and having laterally resilient spring portions, a pair of U-shaped torsion bars each having one lever arm end secured to said frame and another end connected to a suspension link, a torque arm interconnecting said axle and said frame.

9. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being formed of leaf spring material and having laterally resilient spring portions, a pair of U-shaped torsion bars each having one lever arm end secured to said frame and another lever arm end connected to a suspension link, a ball and socket joint interconnecting the end of said last mentioned lever arm and said suspension link, a torque arm interconnecting said axle and said frame.

10. A vehicle frame, a vehicle axle, suspension means interconnecting said axle and said frame, said suspension means comprise a pair of left and right suspension links each having one of their ends pivotally connected to said axle and the other of their ends pivotally connected to said frame, said suspension links being arranged in a forwardly and outwardly diverging relationship, said suspension links having laterally resilient spring portions, suspension spring means constructed to support said frame on said axle and said wheels, a torque arm interconnecting said axle and said frame, means connecting one end of said torque arm to said axle and constructed to permit lateral displacement of said axle relative to said frame while at the same time resisting rotation of said axle about its own axis, means connecting the other end of said torque arm to said frame and constructed to permit said other end to be displaced longitudinally while resisting vertical displacement of said other end relative to said frame, said suspension means permitting said vehicle frame to move laterally with respect to said axle whereby one end of said axle is moved forwardly and the other end of said axle is moved rearwardly to provide an understeer effect.

11. The combination of claim 10 and including said suspension spring means comprising a pair of torsion springs each having one end connected to said frame and another end connected to a suspension link.

12. A vehicle frame, a vehicle axle, suspesion means interconnecting said axle and said frame, said suspension means comprise a pair of left and right suspension links each having one of their ends pivotally connected to said axle and the other of their ends pivotally connected to said frame, said suspension links being formed of leaf spring material and having laterally resilient spring portions, suspension spring means constructed to support said frame on said axle and said wheels, a torque arm interconnecting said axle and said frame, means connecting one end of said torque arm to said axle constructed to permit lateral displacement of said axle relative to said frame while at the same time resisting rotation of said axle about its own axis, means connecting the other end of said torque arm to said frame constructed to permit said other end to be displaced longitudinally while resisting vertical displacement of said other end relative to said frame.

13. The combination of claim 12 and including said suspension spring means comprising a pair of torsion springs each having one end connected to said frame and another end connected to a suspension link.

14. A vehicle frame, a vehicle axle, a road wheel rotatably mounted at each of the ends of said axle, suspension means interconnecting said axle and said frame, said suspension means comprise a pair of left and right suspension links each having one of their ends pivotally connected to said axle and the other of their ends pivotally connected to said frame, said suspension links being formed of leaf spring material and having laterally resilient spring portions, suspension spring means constructed to support said frame on said axle and said wheels, a suspension arm interconnecting said axle and said frame.

15. The combination of claim 14 and including said suspension spring means comprising a pair of torsion springs each having one end connected to said frame and another end connected to a suspension link.

16. The combination of claim 15 and including a ball and socket joint interconnecting said other torsion spring end and said suspension link.

17. A vehicle frame, a vehicle axle, suspension means interconnecting said axle and said frame, said suspension means comprise a pair of left and right suspension links each having one of their ends pivotally connected to said axle and the other of their ends pivotally connected to said frame, a pair of left and right brackets secured to said frame adjacent to said links, a pair of left and right U-shaped torsion springs, each of said springs having one end secured to a bracket and another portion pivotally connected to the same bracket, the end of said other portion being connected to a suspension link, a suspension arm interconnecting said axle and said frame.

References Cited by the Examiner
UNITED STATES PATENTS

| | | | |
|---|---|---|---|
| 3,002,580 | 10/1961 | Mueller et al. | 180—73 |
| 3,029,091 | 4/1962 | Allison | 280—124 |
| 3,205,967 | 9/1965 | Stotz et al. | 180—73 |

BENJAMIN HERSH, *Primary Examiner.*

M. S. SALES, *Assistant Examiner.*